June 14, 1966  T. Y. KORSGREN, JR  3,256,396
ACCELERATION RESPONSIVE SWITCH
Filed July 13, 1961  3 Sheets-Sheet 1

INVENTOR
THEODORE Y. KORSGREN, JR
BY
Mandeville & Schweitzer
ATTORNEYS

June 14, 1966　　　T. Y. KORSGREN, JR　　　3,256,396

ACCELERATION RESPONSIVE SWITCH

Filed July 13, 1961　　　　　　　　　　　　3 Sheets-Sheet 2

INVENTOR
THEODORE Y. KORSGREN, JR.
BY
*Mandeville & Schweitzer*
ATTORNEYS

June 14, 1966  T. Y. KORSGREN, JR  3,256,396
ACCELERATION RESPONSIVE SWITCH
Filed July 13, 1961  3 Sheets-Sheet 3

INVENTOR
THEODORE Y. KORSGREN, JR
BY
Mandeville & Schweitzer
ATTORNEYS

United States Patent Office 3,256,396
Patented June 14, 1966

3,256,396
ACCELERATION RESPONSIVE SWITCH
Theodore Y. Korsgren, Jr., Woodbury, Conn., assignor to Tri-Tek, Inc., a corporation of Connecticut
Filed July 13, 1961, Ser. No. 123,786
10 Claims. (Cl. 200—61.45)

This invention relates generally to an acceleration responsive actuator device and more specifically to an assembly providing sequential release and operation of its component parts according to the imposition thereon of a sequence of acceleration forces, typically an increasing force followed by a decreasing force.

In rocket propulsion systems, for example, it is often necessary to program the actuation of the system in accordance with predetermined acceleration or deceleration forces which may be imposed on the system in operation. The present invention provides an improved control instrumentality for this purpose, although, as will appear, the new device may be adapted for uses other than specifically disclosed in relation to the particular embodiment described herein.

In accordance with one aspect of the invention, an improved acceleration responsive control device is provided which responds to sequentially occurring acceleration and deceleration to effect a desired control function. Thus, upon the imposition of a predetermined acceleration force, corresponding to proper launching and acceleration of a rocket, for example, the new control device performs an actuating function and "enables" itself for the performance of the ultimate, desired function upon subsequent deceleration. The arrangement is such that the ultimate control function (e.g., the arming of a war head) cannot be performed unless the programmed acceleration of the rocket has taken place to first "enable" the control.

In accordance with another aspect of the invention, the control device is provided with an internal control, such that momentarily applied acceleration forces, such as shock forces, for example, will not enable this control. The this end, a novel gas flow control arrangement is provided, including an inertia valve, which serves to close a gas flow passage partly or completely, under high acceleration force, and thereby significantly retard the movement of certain acceleration responsive elements of the control. Accordingly, unusually high forces, applied momentarily, will not actuate the control. In addition, the gas flow means serves to retard movement of certain acceleration responsive members even in response to normal acceleration forces, such that the forces must be of sustained duration to effect actuation of the control.

The above and other advantageous aspects of the invention will be understood upon reference to the following detailed description of a preferred embodiment of the invention and to the accompanying drawing, in which.

Figure 1:
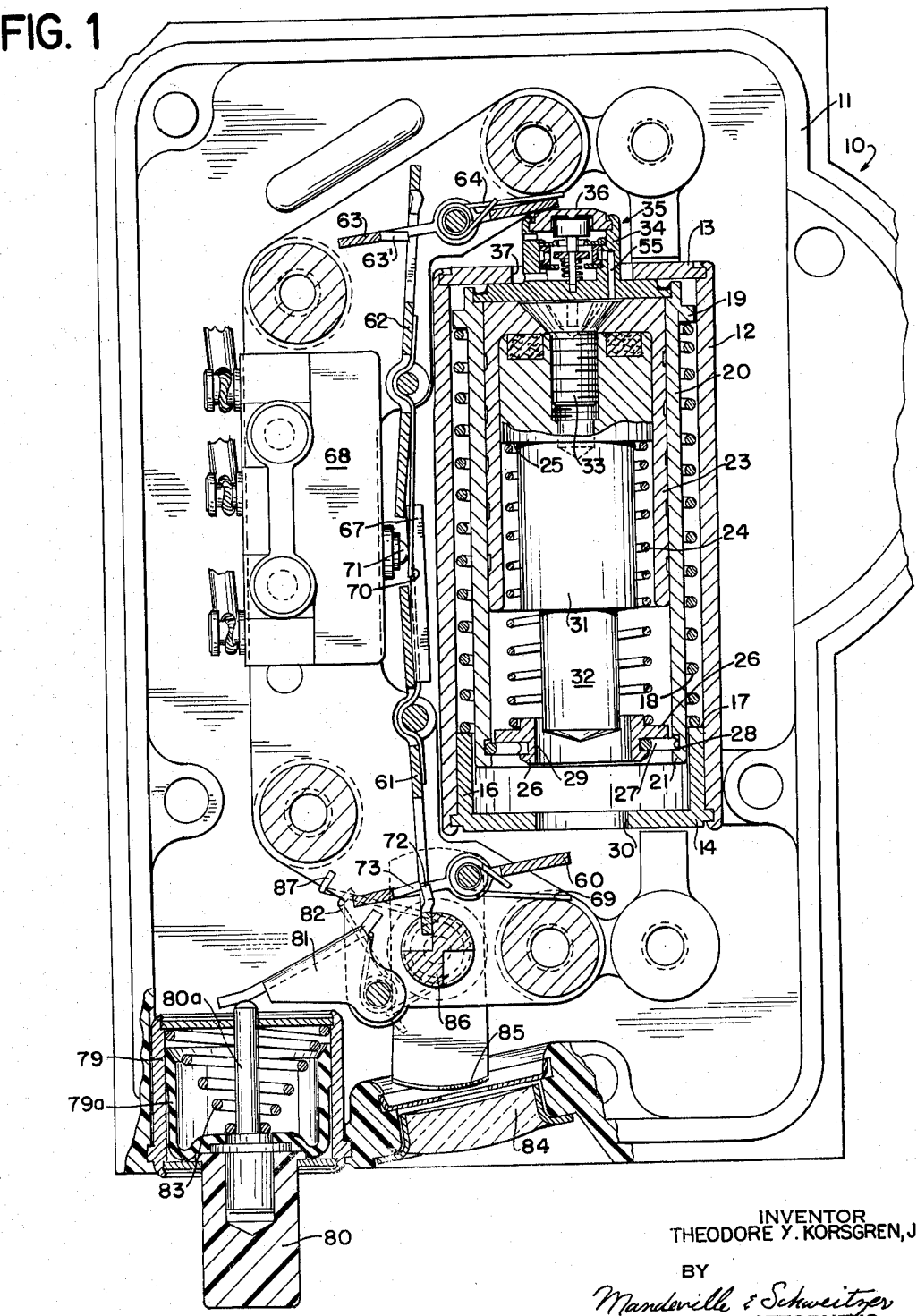
FIG. 1 is a cross-sectional view of an acceleration responsive actuating device constructed according to the invention.

Referring now to the drawings, and initially to FIG. 1 thereof, the new acceleration responsive actuating device is designated generally by the reference numeral 10. The actuator 10 comprises a suitable housing 11 enclosing the component parts of the actuating device, and it will be understood that the housing may be mounted in a longitudinal disposition within a rocket system, for example. Mounted within the housing 11 is a guide 12, advantageously in the form of a cylinder, having end caps 13, 14 secured thereto. The lower cap 14 has a vertical sleeve-like portion 16 which fits closely within the cylinder 12, and the upper end of the sleeve forms a shoulder 17 which defines a reference surface in supporting engagement with a helical spring 18 extending upwardly within the cylinder. The upper end of the spring 18 presses against a radial flange 19 which is formed as an integral part of a first mass member 20, advantageously in the form of a piston. The piston 20 is guided by contact between the flange 19 and the interior wall of the cylinder 12 and by a relatively close fit between its cylindrical wall 21 and the sleeve 16. The piston 20 is biased toward the upper end cap 13 of the cylinder 12 by the spring 18 and remains in engagement with the end cap until such time as acceleration forces overcome the spring force and move the piston 20 downward within the cylinder.

The piston 20, being of hollow cylindrical construction, accommodates a second mass member, advantageously in the form of a second or inner piston 23, for slidable movement therein. The piston 23 is supported in the outer piston 20 by means of a second helical spring 24, which presses upward against an annular shoulder 25 formed on the piston 23. The lower end of the second spring 24 is supported by a collar 26, which in turn is positioned by a snap ring 27 secured within an annular groove 28 in the interior wall of the outer piston 20. The collar 26 has a central opening 29 therein, which is in alignment with an opening 30 provided in the lower cap 14.

Advantageously, the piston 23 carries a predetermined mass 31 having a lower portion of reduced diameter forming a plunger 32. A screw 33 secures the mass 31 to the upper end of the piston 23, and the assembly forms the second mass member.

As illustrated in FIG. 1, the mass 31 and its plunger-like extension 32 normally are housed completely within the main cylinder 12. However, as will be described in more detail below, the plunger is adapted to be projected through the opening 30 in the lower end cap, under the influence of predetermined acceleration forces, to perform a control function.

In accordance with one aspect of the invention, the outer piston 20 carries at its upper end a valve 35, including a housing or extension 34, the cap 36 of which forms an abutment surface. The housing 34, which normally projects upward from the cap 13 of the main cylinder 12, through an opening 37 therein, houses an improved acceleration responsive or inertia valve including a plunger 39 (FIG. 5) which is biased upwardly by a spring 40.

Figure 5:
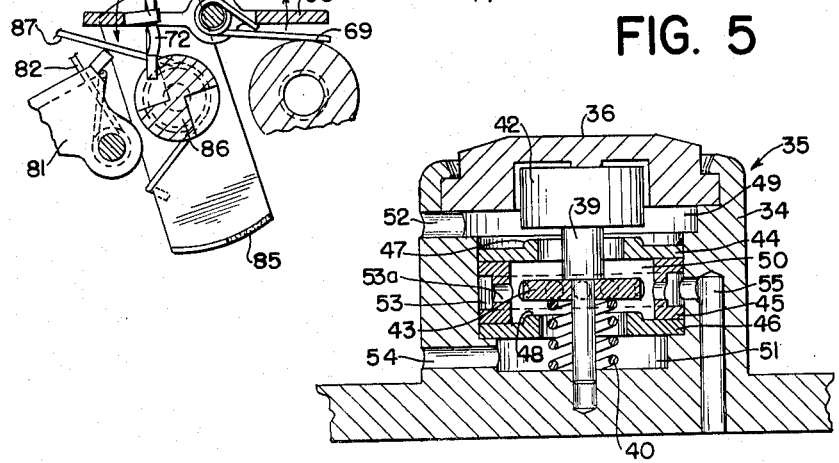
FIG. 5 is an enlarged cross-sectional view of an improved acceleration responsive valve incorporated in the actuating device of the invention.

As shown best in FIG. 5, the plunger 39 mounts a pair of spaced discs or seals 42, 43, the total assembly possessing a sufficient predetermined mass to make the plunger movable against the spring 40 under the influence of an acceleration force of a predetermined magnitude. The housing 34 has mounted therein two transverse discs 44, 46 which form valve seats 47, 48, respectively. The discs 44, 46, together with the cap 36 and the top of the piston 20, define three chambers 49, 50, and 51. The upper chamber 49 communicates with the exterior of the valve housing 34, by a port 52, and the lower chamber 51 also communicates with the exterior of the valve housing by a port 54.

In the illustrated form of the invention, the interior chamber 50 is formed in part by a header ring 45, which is received closely within a cylindrical bore in the housing and which also serves as a spacer for the valve discs 44, 46. The header ring 45 is provided about its outer circumference with an annular recess 53 communicating with a relatively large plurality of radial bores 53a. In turn, the annular recess 53 is in open communication with a restricted passage 55 in the wall of the valve housing, such that there is a regulated flow of air from the intermediate chamber 50 through the passage 55 when the valve is open.

Thus, it will be understood that movement of the inner piston 23 downward relative to the outer piston 20 (under circumstances to be described) will cause a regulated flow of air to be admitted into the upper portion of the outer piston through the passageway 55 from the intermediate chamber 50 of the valve housing 34, which chamber is supplied with ambient air through the lower and upper chambers 49, 51. If, however, the piston 23 tends to move at a higher rate than desired, due to the imposition of an extremely high acceleration force, for example, in the order of 32–35 gravities, the valve plunger 39 will be forced down by its own mass, and the valve 35 will seal off the middle chamber 50, substantially limiting the passage of air into the space above the inner piston 23. The decrease of air flow will operate to retard the movement of the inner piston.

In accordance with one aspect of the invention, the aerodynamic characteristics of the valve are such that the flow of air into the chamber 50 causes mutually compensating forces to be applied to the valve plunger 39, so that movements of the plunger are influenced only by the spring 40 and the applied acceleration forces. To this end, the valve element 43 is positioned within the chamber 50, such that inflowing air tends to open the valve, while the valve element 42 is located outside the chamber, such that inflowing air tends to close the valve. The sizes and shapes of the valve elements and seats are such that these opposing forces are as well balanced as practicable. Further, by providing a large plurality (e.g., twelve) of radial bores in the header ring 45, the air is caused to flow uniformly around the valve elements, so that the flow does not tend to bind the valve plunger and interfere with its proper inertial responses.

Mounted adjacent the guide cylinder 12, within the main housing 11, is a multiple switch assembly 68 appropriate for the desired control purpose. And, in the specific form of the invention herein illustrated, a pair of actuating levers 61, 62 are mounted adjacent the switch for actuating certain of the elements thereof. The upper lever 62 tends to rotate counter-clockwise, but is restrained by the lower lever 61, which has an extension 67 bearing on the end of the lever 62 and also upon one or more switch actuators, such as the actuator 71. The lower lever 61 tends to rotate clockwise but it is restrained by a lower locking lever 60.

Both of the levers 60, 61 initially are locked in the position shown in FIG. 1, with certain of the switches being held in a first actuated condition by the extension 67 and certain other switches being held in a first actuated condition by a spring extension 70 of the upper lever 62.

Advantageously, the lower locking lever 60 is urged to pivot counter-clockwise, by a spring 69, substantially into the position shown in FIG. 1, so that it will automatically lockingly engage the actuating lever 61, by means of the engagement of sear tabs 72, 73, when the lever 61 is in a counter-clockwise position. An upper locking lever 63 is urged to pivot clockwise, by a spring 64, into locking engagement with the upper actuating lever 62, but it normally is held in a counter-clockwise rotated position by the valve housing extension 34, which acts upon the locking lever under the force of the helical spring 18.

Figure 2:
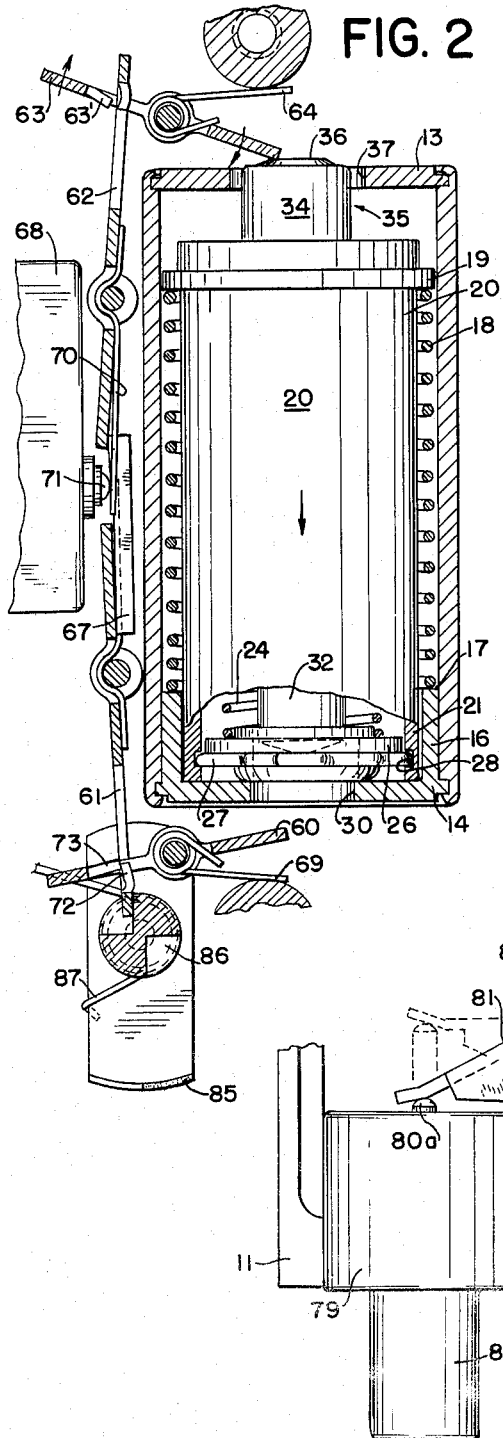
FIG. 2 is a fragmentary cross-sectional view of the device of FIG. 1, illustrating certain of the components thereof when the device is under the influence of a first acceleration force.

Assuming the parts to be in their relative positions of FIG. 1, and the imposition thereupon of a gradually increasing acceleration force, the sequence of operation of the device as described so far will be as follows:

Upon attainment of, for example, an acceleration force of 10 gravities, the outer piston 20, its valve housing extension 34 and the abutment surface 36 thereof, together with the inner piston 23, will begin to move toward the lower end of the cylinder 12, the inner piston retaining its initial position relative to the outer piston 20. When the acceleration force increases to near 18 gravities, the outer piston 20 will bottom within the cylinder 12, and the parts will be in the relative positions shown in FIG. 2. It will be noted that, in these positions, the lever 63 will have been rotated by its spring 64 in a clockwise direction from its position of FIG. 1 into a position to lockingly engage the actuating lever 62, substantially as illustrated in FIG. 2.

As the acceleration force increases to, for example, 18–21 gravities, the inner piston 23 and the plunger 32 thereof will move downward independently of the outer piston 20, and the valve 35 will admit a regulated flow of air to the top of the piston 23 to accommodate such movement. Should the downward movement of the piston 23 tend to exceed a certain rate, however, a partial vacuum will be formed above the piston 23 to retard the movement of the piston. The arrangement advantageously is such that an acceleration force of around 18 gravities must be sustained for about four seconds in order for the piston 23 to travel the full extent of its operative stroke.

Should the piston 23 be acted upon by an unusually high acceleration force (e.g., over 21 gravities), where the piston 23 might tend to bottom extremely rapidly, the inertia valve 35 will close to shut off the supply of air and significantly retard the movement of the inner piston 23. The arrangement is such that under an acceleration force of 32 gravities, at least 2.6 seconds is required for the operative stroke of the inner piston 23.

Figure 3:
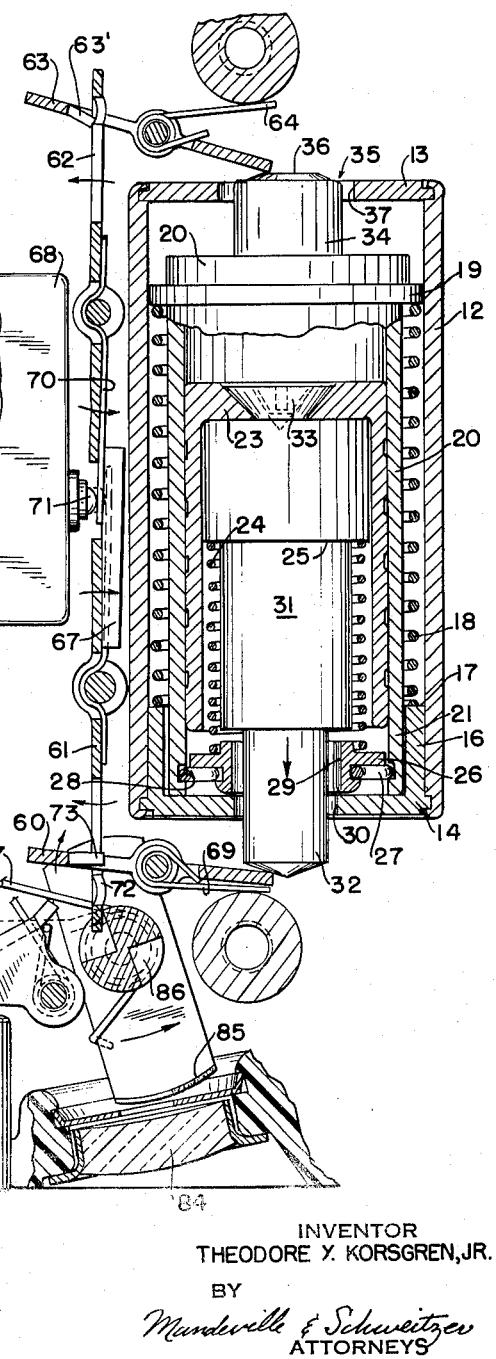
FIG. 3 is a fragmentary cross-sectional view, similar to FIG. 2, illustrating the components when the device is under the influence of a greater acceleration force.

When the piston 23 has descended through its full operative stroke, to the position shown in FIG. 3, the plunger 32 depresses the lever 60 causing it to release the lever 61. This action releases or actuates the switch or switches controlled by lever 61 and also releases the end of the lever 62. The lever 62 (see FIG. 2) will rotate counter-clockwise for a short distance and will then be caught against the sear element 63' of the upper locking lever 63. In this respect, it will be remembered that the lever 63 was permitted to rotate into the position of FIG. 3 when the outer piston 20 moved downward initially within the guide cylinder 12.

In the condition of the device shown in FIG. 3, the lever 62, through its spring extension 70, will still maintain sufficient pressure against the appropriate actuator or actuators 71 to prevent actuation of the switches associated therewith. However, upon the subsequent diminishing of acceleration forces, to a value less than 10 gravities, for example, the outer piston 20 will again rise within the cylinder 12, and the abutment surface 36 thereof will contact and cause counter-clockwise rotation of the locking lever 63. When this occurs, the actuating lever 62 will be unlocked and the actuator(s) 71 will be released.

Figure 4:
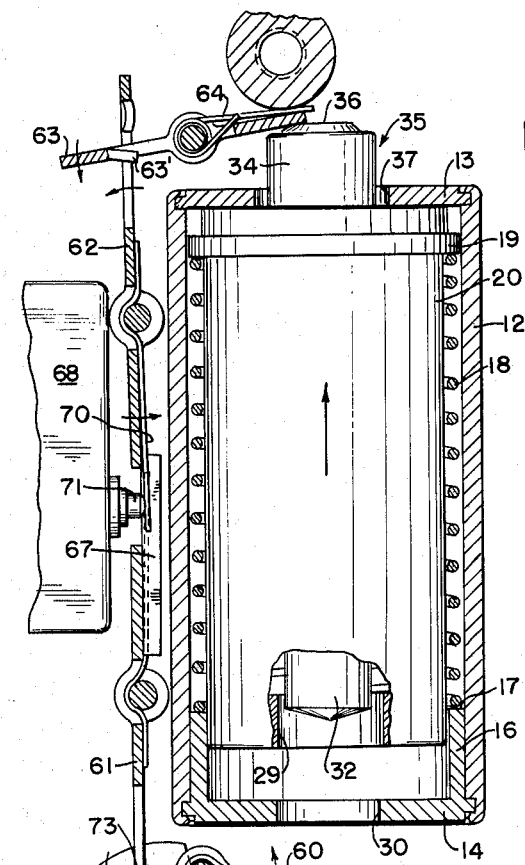
FIG. 4 is a fragmentary cross-sectional view similar to FIGS. 2 and 3, illustrating the movement and placement of various components of the actuating device after deceleration.

Upon release of the lever 62, the actuator 71 moves outwardly, imparting appropriate actuation to the switch 68, and the actuating lever 62 is pivoted counter-clockwise into the position indicated in FIG. 4. At this stage the switch mechanism is fully actuated, and both of the levers 61, 62 have been disengaged from their respective locking levers 60, 63. No further actuation of the switch 68 is caused or permitted until the mechanism is properly reset, as described below.

Advantageously, a reset mechanism is provided to return the device to the condition shown in FIG. 1, after actuation thereof for test or other purposes. To this end, a sleeve 79 is mounted in the lower wall of the main housing 11 and movably supports a reset button 80. The button and housing are maintained in sealed relation by means of a flexible diaphragm or bellows 79a bonded to the sleeve 79 and also to the reset button 80.

The reset button 80 has a plunger extension 80a, which engages at its inner end with one end of a reset bell crank lever 81. The other end of the bell crank lever is positioned to engage the lower end of the actuating lever 61.

Normally, the reset bell crank lever 81 is urged by a spring 82 to rotate counter-clockwise, and the reset button 80 is correspondingly urged outward by a spring 83, so that the reset mechanism does not interfere with the normal operation of the device. In order to reset the device, the reset button 80 is depressed, and the bell crank 81 is thereby rocked in a clockwise direction. The upper end of the bell crank engages the lower end of the actuating lever 61 and moves it to the right until it becomes lockingly engaged with the lower locking lever 60. The lower actuating lever 61, in turn, moves the upper actuating lever 62 into its reset position and retains it in such position as previously described.

The condition of the device may be ascertained at any time by means of a viewing window 84 and indicator 85. The indicator 85 is mounted on a notched shaft 86 positioned to engage the lower end of the actuating lever 61 and urged to rotate counter-clockwise by a spring 87. When the actuating lever 61 is in the position shown in FIG. 1, the shaft 86 is rotated clockwise to bring certain indicia of the indicator 85 into view at the window 84. But, when the device is actuated to release the lever 61, the shaft 86 is released for counter-clockwise rotation and presents other indicia at the viewing window.

It will be understood, of course, that the specific form of the invention herein illustrated and described is intended to be representative only, as certain changes may be made therein without departing from the clear teachings of the invention. Thus, by way of example only, the order of control functions to be performed may be varied considerably, and the device may be conditioned to respond to acceleration and deceleration forces in different orders and of different magnitudes. Furthermore, any of the movements of the device may be made subject to time function control, where desirable or appropriate, along the lines employed to regulate the movements of the piston 23. Accordingly, reference should be made to the following appended claims in determining the full scope of the invention.

I claim:

1. An acceleration responsive actuating device comprising a housing, mass means disposed within said housing for linear movement with respect thereto between predetermined positions in response to variations in the acceleration of said housing, biasing means for urging said mass means toward one of said predetermined positions, actuating means in juxtaposition with said mass means and operable in response to movement of said mass means to said other predetermined position against the action of said biasing means, and damping means for forming a partial vacuum within a portion of said housing upon movement of said mass means toward said other predetermined position in response to momentarily applied acceleration forces, but said damping means permitting movement of said mass means to said other position in response to acceleration forces of sustained duration.

2. An acceleration responsive actuating device comprising an enclosed housing, mass means disposed within said housing for movement with respect thereto between predetermined positions in response to variations in the acceleration of said housing, means including a biasing spring for urging said mass means toward one of said predetermined positions, actuating means having a switch actuating element and a locking element in juxtaposition with said mass means, said locking element being engageable by said mass means in response to movement thereof to said other predetermined position, to thereby release said switch actuating element, and damping means for forming a pressure differential within said housing upon movement of said mass means toward said other predetermined position in response to momentarily applied acceleration forces, but said damping means permitting movement of said mass means to said other position in response to acceleration forces of sustained duration.

3. An acceleration responsive actuating device comprising a housing, mass means disposed within said housing for movement with respect thereto between predetermined positions in response to variations in the acceleration of said housing, means including a biasing spring for urging said mass means toward one of said predetermined positions, actuating means in juxtaposition with said mass means and operable in response to movement of said mass means to said other predetermined position against the action of said biasing means, damping means for forming a pressure differential within said housing upon movement of said mass means toward said other predetermined position in response to momentarily applied acceleration forces, but said damping means permitting movement of said mass means to said other position in response to acceleration forces of sustained duration, and manually operable reset means for restoring said actuating means to an initial condition.

4. An acceleration responsive actuating device comprising a first mass member movable in response to a first predetermined acceleration force, a second mass member movable in response to a second predetermined acceleration force, means releasable in sequence by said first and second masses during movement thereof, said last-mentioned means including switch actuating means actuated partially in response to movements of said first and second mass members responsive to increasing acceleration forces and fully actuated by return movement of said first mass member in response to decreasing acceleration forces, and resilient means for biasing said first and second mass members resiliently in opposition to said first and second acceleration forces, said resilient means being so related to said mass members that movement of said first mass member occurs under a lesser acceleration force than movement of said second mass member.

5. An acceleration responsive device comprising movable mass means, spring means biasing said mass means in one direction, said mass means being movable in the other direction under the influence of predetermined acceleration forces, first actuating means engageable and operable by said mass means upon predetermined movement thereof in said other direction, and second actuating means engageable and operable by said mass means upon retrun movement in said one direction, said first actuating means maintaining said second actuating means inoperable except upon prior operation of said first actuating means.

6. An acceleration responsive actuating device comprising movable mass means, spring means biasing said mass means in one direction, said mass means being movable in the other direction under the influence of predetermined acceleration forces, first actuating means including a restraining element and a first locking element, said first locking element being engageable and operable by said mass means upon predetermined movement thereof in said other direction to release said restraining element, and second actuating means including an actuating element and a second locking element engageable and operable by said mass means upon return movement in said one direction, the actuating element of said second actuating means being engageable by the restraining element of said first actuating means to restrain movement of said actuating element independently of said second locking element and thereby maintain said second actuating means inoperable except upon prior operation of said first actuating means.

7. An acceleration responsive actuating device comprising a control device for performing a first and a second control function, movable mass means for operating said control device, spring means biasing said mass means in one direction, said mass means being movable in the other direction under the influence of predetermined acceleration forces, first actuating means including a restraining element in position to contact said control device and a first locking element, said first locking element being engageable and operable by said mass means upon predetermined movement thereof in said other direction to release said restraining element, said restraining element contacting said control device upon release to perform said first control function, and second actuating means including an actuating element in position to contact said control device and a second locking element, said second locking element being engageable and operable by said mass means upon return movement in said one direction to enable the release of said actuating element, said actuating element being movable into contact with said control device upon release to perform said second control function, the actuating element of said second actuating means being engageable by the restraining element of said first actuating means to restrain movement of said actuating element independently of said second locking element and thereby maintain said second actuating means inoperable except upon prior operation of said first actuating means.

8. An acceleration responsive device comprising movable mass means including a primary mass member and a secondary mass member relatively movable with respect to each other, spring means biasing said mass members in one direction, and having separate spring elements acting upon the respective members, said mass members being movable in the other direction under the influence of predetermined acceleration forces, said spring elements providing different resistances to the movements of said mass members in said other direction to effect movement thereof in response to different acceleration forces, first actuating means engageable and operable by said secondary mass member upon predetermined movement thereof in said other direction, and second actuating means engageable and operable by said primary mass member upon return movement in said one direction, said first actuating means maintaining said second actuating means inoperable except upon prior operation of said first actuating means.

9. An acceleration responsive device comprising a housing having a reference surface, movable mass means including a primary mass member and a secondary mass member relatively movable with respect to each other within said housing, spring means biasing said mass members in one direction and having separate spring elements acting upon the respective members, one of said spring elements acting between said primary mass member and said reference surface and the other of said spring elements acting between said primary and secondary mass members, said mass members being movable in the other direction under the influence of predetermined acceleration forces, said spring elements providing different resistances to the movements of said mass members in said other direction to effect movement thereof in response to different acceleration forces, first actuating means engageable and operable by said secondary mass member upon predetermined movement thereof in said other direction, and second actuating means engageable and operable by said primary mass member upon return movement in said one direction, said first actuating means maintaining said second actuating means inoperable except upon prior operation of said first actuating means.

10. The device of claim 9 in which said secondary mass member is carried by said primary mass member.

References Cited by the Examiner

UNITED STATES PATENTS

| | | | |
|---|---|---|---|
| 2,183,002 | 12/1939 | Bach | 73—515 |
| 2,311,637 | 2/1943 | Buchanan | 200—61.49 |
| 2,776,829 | 1/1957 | Cockram | 73—515 |
| 2,867,382 | 1/1959 | Weaver | 73—514 X |
| 2,881,277 | 4/1959 | Marks et al. | 200—61.45 |
| 2,898,416 | 8/1959 | Clurman | 200—61.45 |
| 2,991,339 | 7/1961 | Williams et al. | 200—61.46 |
| 2,997,883 | 8/1961 | Wilkes | 200—61.53 |
| 3,001,039 | 9/1961 | Johnson | 200—61.45 |
| 3,018,664 | 1/1962 | Humble | 200—61.53 |
| 3,020,367 | 2/1962 | Bariffi | 200—61.53 |
| 3,096,411 | 7/1963 | Chabrek et al. | 200—61.53 |
| 3,117,196 | 1/1964 | Vincent | 200—61.53 |

BERNARD A. GILHEANY, *Primary Examiner.*

MAX L. LEVY, ROBERT K. SCHAEFER, *Examiners.*

L. H. BENDER, B. DOBECK, *Assistant Examiners.*